United States Patent
Thota

(10) Patent No.: US 7,415,448 B2
(45) Date of Patent: Aug. 19, 2008

(54) ADAPTIVE ENGINE FOR PROCESSING GEOGRAPHIC DATA

(75) Inventor: Chandrasekhar Thota, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 193 days.

(21) Appl. No.: 11/384,801

(22) Filed: Mar. 20, 2006

(65) Prior Publication Data
US 2007/0239648 A1    Oct. 11, 2007

(51) Int. Cl.
*G06F 17/00* (2006.01)
*G06N 5/02* (2006.01)

(52) U.S. Cl. ....................................... 706/47
(58) Field of Classification Search .......... None
See application file for complete search history.

(56) References Cited

U.S. PATENT DOCUMENTS

| | | | |
|---|---|---|---|
| 5,193,185 A | | 3/1993 | Lanter |
| 5,701,394 A | | 12/1997 | Arita et al. |
| 5,715,469 A | * | 2/1998 | Arning ................. 715/533 |
| 5,787,407 A | | 7/1998 | Viot |
| 6,151,424 A | * | 11/2000 | Hsu ...................... 382/294 |
| 6,163,749 A | * | 12/2000 | McDonough et al. ...... 701/208 |
| 6,204,778 B1 | * | 3/2001 | Bergan et al. ............ 340/936 |
| 6,308,177 B1 | * | 10/2001 | Israni et al. ............. 707/100 |
| 6,321,158 B1 | * | 11/2001 | DeLorme et al. .......... 701/201 |
| 6,374,241 B1 | * | 4/2002 | Lamburt et al. ............ 707/6 |
| 6,393,415 B1 | * | 5/2002 | Getchius et al. ............ 707/2 |
| 6,397,228 B1 | * | 5/2002 | Lamburt et al. ........... 707/203 |
| 6,400,996 B1 | | 6/2002 | Hoffberg et al. |
| 6,404,920 B1 | * | 6/2002 | Hsu ...................... 382/190 |
| 6,408,294 B1 | * | 6/2002 | Getchius et al. ............ 707/5 |
| 6,421,683 B1 | * | 7/2002 | Lamburt ................. 707/104.1 |
| 6,442,485 B2 | * | 8/2002 | Evans ...................... 701/301 |
| 6,484,161 B1 | * | 11/2002 | Chipalkatti et al. ........... 707/3 |
| 6,493,721 B1 | * | 12/2002 | Getchius et al. .......... 707/104.1 |
| 6,496,843 B1 | * | 12/2002 | Getchius et al. ........... 715/210 |
| 6,519,592 B1 | * | 2/2003 | Getchius et al. ............ 707/6 |
| 6,529,890 B1 | * | 3/2003 | Pandit et al. ............. 706/47 |
| 6,578,056 B1 | * | 6/2003 | Lamburt .................. 715/205 |

(Continued)

OTHER PUBLICATIONS

Analysing spatial-temporal data based on generic GIS Hamdi, I.; Farah, I.R.; Ahmed, M.B.; Computer Systems and Applications, 2005. The 3rd ACS/IEEE International Conference on Jan. 6-6, 2005 p. 102 Digital Object Identifier 10.1109/AICCSA.2005. 1387091.*

(Continued)

*Primary Examiner*—Michael B Holmes
(74) *Attorney, Agent, or Firm*—Amin, Turocy & Calvin, LLP

(57) ABSTRACT

The subject disclosure pertains to systems and methods for processing input data provided in multiple formats to generate output data in a standardized, common format. To facilitate processing of the input data, a set of rules can be defined that describe processing for various types and formats of input data. The rules can be maintained separately from the processing component, such that the rules can be updated without necessitating modification of the processing component. Subsets of the rules can be retrieved and utilized to process specific input data. Errors within the input data can be identified and automatically corrected based upon previous input data sets. In addition, rules can be automatically generated based on previous input data and user feedback.

19 Claims, 11 Drawing Sheets

U.S. PATENT DOCUMENTS

| | | | | |
|---|---|---|---|---|
| 6,643,640 | B1 * | 11/2003 | Getchius et al. | 707/3 |
| 6,681,383 | B1 * | 1/2004 | Pastor et al. | 717/126 |
| 6,714,893 | B2 | 3/2004 | Busche et al. | |
| 6,732,120 | B1 * | 5/2004 | Du | 707/104.1 |
| 6,826,559 | B1 * | 11/2004 | Ponte | 707/3 |
| 6,917,925 | B2 | 7/2005 | Berenji et al. | |
| 7,047,242 | B1 * | 5/2006 | Ponte | 707/10 |
| 7,107,285 | B2 * | 9/2006 | von Kaenel et al. | 707/104.1 |
| 7,168,084 | B1 * | 1/2007 | Hendricks et al. | 725/42 |
| 7,197,500 | B1 * | 3/2007 | Israni et al. | 707/100 |
| 7,207,053 | B1 * | 4/2007 | Asmussen | 725/42 |
| 7,305,419 | B1 * | 12/2007 | Cosby et al. | 707/200 |
| 2002/0038307 | A1 | 3/2002 | Obradovic et al. | |
| 2002/0059273 | A1 | 5/2002 | Morimoto et al. | |
| 2002/0188669 | A1 | 12/2002 | Levine | |
| 2004/0128314 | A1 | 7/2004 | Katibah et al. | |
| 2005/0050008 | A1 | 3/2005 | Root et al. | |
| 2005/0065569 | A1 | 3/2005 | Ricci et al. | |

OTHER PUBLICATIONS

GiView: a multi-resolution geographical data retrieval system Dantong Yu; Lei Zhu; Aidong Zhang; Ling Bian; Scientific and Statistical Database Management, 1999. Eleventh International Conference on Jul. 28-30, 1999 p. 277 Digital Object Identifier 10.1109/SSDM.1999.787644.*

Multi-source integration and temporal situation assessment in air combat Petterson, G.; Axelsson, L.; Jensen, T.; Karlsson, M.; Malmberg, A.; Information, Decision and Control, 1999. IDC 99. Proceedings. Feb. 8-10, 1999. 1999 pp. 371-375 Digital Object Identifier 10.1109/IDC.1999.754186.*

Design of fan filters with arbitrary angle and /spl plusmn/45/spl deg/ orientation Hai Liu; Xiyu Du; Zhengding Qiu; TENCON '93. Proceedings. Computer, Communication, Control and Power Engineering.1993 IEEE Region 10 Conference on Issue 0, Part 30000, Oct. 19-21, 1993 pp. 598-600 vol. 3 Digital Object Identifier 10.1109/TENCON.1993.328058.*

Don Murray, et al., "ESRI's Spatial Database Engine: A Seamless GIS Solution" 10 pages, last accessed, Jan. 11, 2006, accessible at: http://gis.esri.com/library/userconf/proc96/TO100/PAP094/P94.HTM.

James MacGill, et al., "Web-based multi-agent spatial analysis tools", GeoComputation 1999, Department of Geography, University of Leeds, 12 pages, last accessed, Jan. 11, 2006, accessible at: http://www.geovista.psu.edu/sites/geocomp99/Gc99/069/gc_069.htm, United Kingdom.

Mehmet Emin Donderler, et al., "Rule-Based Spatio-Temporal Query Processing for Video Databases", VLDB Journal, Jan. 2004, pp. 86-103, 17 pages, vol. 13, No. 1.

Paul Sanders, "Real-time Business Intelligence Using Analysis Services", SQL Server 2005, Apr. 1, 2005, 11 pages.

* cited by examiner

ADAPTIVE ENGINE FOR PROCESSING GEOGRAPHIC DATA

BACKGROUND

Geographical information such as satellite or aerial photographs, textual data (e.g., directions or descriptions), or any of a variety of types of maps (e.g., road maps, topographical maps, geologic maps, plats and nautical charts) has become increasingly available to information seekers through electronic information sources on the Internet, vehicle navigation systems, handheld devices (e.g., personal digital assistants (PDAs), a smartphone) or any of a variety of other sources. Typically, geographical information can be searched either for a specific address or a particular place or thing, such as a business, an intersection or a named location. In response to a search, information seekers can be presented with a map, photograph, directions between locations or any other information regarding the search location.

Collection of this geographic data is an enormous task. The sheer volume of geographical information is immense. Within the United States of America alone, there are millions of addresses, streets and other geographical objects. In addition, geographic data is continually changing. While certain geographic features such as mountains and deserts change slowly, others such as roads, addresses and zip codes are continuously changing due to road construction, building construction, changes in governmental regulations and the like. To ensure that users are provided with accurate information, geographical data should be continually collected and updated.

Typically, geographical data is collected by multiple vendors. Collection of geographic data involves dealings with numerous political entities, languages and regional customs. Consequently, it is unlikely that a single vendor will be able to provide geographic data covering the entire world. Instead, as an example, geographic data for Germany can be collected by a first vendor, while data for Japan can be collected by a separate vendor. Each vendor is likely to use their own proprietary format or scheme for storing the geographical data. In addition, the type of data collected as well as the relationships between geographic objects can vary from vendor to vendor and region to region. For example, certain countries include states and counties, while others include provinces and territories. This data can be aggregated and transformed to a common format for use by software applications (e.g., map and direction providers) and other users.

SUMMARY

The following presents a simplified summary in order to provide a basic understanding of some aspects of the claimed subject matter. This summary is not an extensive overview. It is not intended to identify key/critical elements or to delineate the scope of the claimed subject matter. Its sole purpose is to present some concepts in a simplified form as a prelude to the more detailed description that is presented later.

Briefly described, the provided subject matter concerns processing input data provided by multiple vendors in a variety of formats to generate output data in a standardized, common format. In particular, the input data can include geographical data such as street addresses, cities, states, countries and the like. One or more sets of rules or instructions for processing the input data sets to generate output data can be created and maintained. A transformation component can select one or more subsets of rules to be used to transform the input data. A transformation component can generate executable code based on the rules to execute on the input data to generate output data in a common format. The rules can be maintained separately from the transformation component, such that the rules can be updated to reflect changes to the input data formats without necessitating modification of the transformation component.

In another aspect, the transformation component can include one or more artificial intelligence components to improve performance and usability. For example, an artificial intelligence component can be used to infer which set or sets of rules should be retrieved and used to process input data. Also, an artificial intelligence component can be used to detect and automatically correct errors in the input data. The artificial intelligence component performing error detection can detect unusual changes in data values, identify probable errors and assign a score indicative of the probability the data is incorrect. In addition, an artificial intelligence component can be used to generate additional rules based upon previous input data and user feedback To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

DETAILED DESCRIPTION

Figure 1:
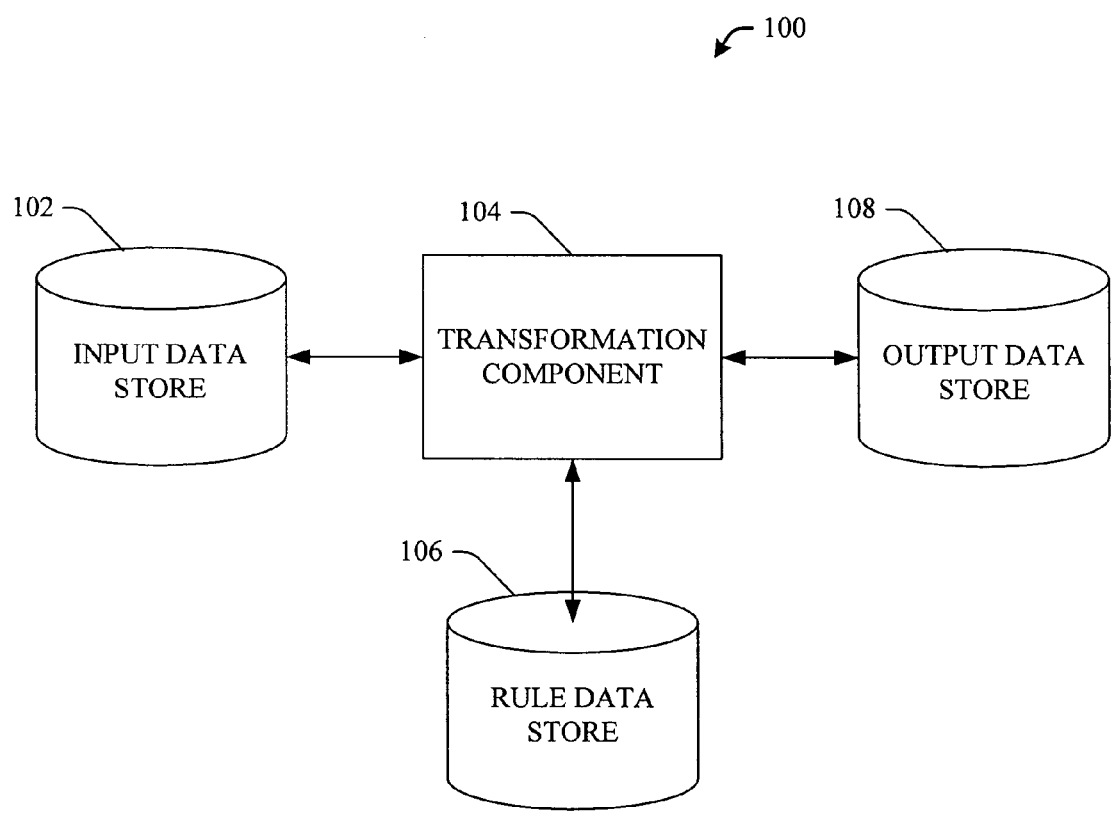
FIG. 1 is a block diagram of a system for transforming input data in accordance with an aspect of the subject matter disclosed herein.

The various aspects of the subject matter disclosed herein are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

As used herein, the terms "component," "system" and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The word "exemplary" is used herein to mean serving as an example, instance, or illustration. Any aspect or design described herein as "exemplary" is not necessarily to be construed as preferred or advantageous over other aspects or designs.

As used herein, the term to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic-that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Furthermore, the disclosed subject matter may be implemented as a system, method, apparatus, or article of manufacture using standard programming and/or engineering techniques to produce software, firmware, hardware, or any combination thereof to control a computer or processor based device to implement aspects detailed herein. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Geographic data can be received from multiple vendors, aggregated and transformed to a common format for use by a variety of software applications and users. The received data can be in multiple, vendor dependent formats. In addition, vendors can change data formats frequently. The requirements or rules for transforming the geographic data from the vendor format or formats to the common format can be hard-coded into the data processing system. However, if the requirements are hard-coded, it can be time-consuming to update the requirements based on every modification to the vendor formats or the common format. Alternatively, the requirements or rules for processing the vendor data can be maintained separately from the data processing system and retrieved at processing time.

Referring now to FIG. 1, a system 100 for transforming input data and generating output data is illustrated. The system 100 includes an input data store 102, a transformation component 104, a rule data store 106 and an output data store 108. The transformation component 104 receives input data from the input data store 102 and utilizes one or more sets of rules obtained from the rule data store 106 to transform the input data. The transformed data can be output to the output data store 108. In particular, the transformation component 104 can process geographical data provided by one or more vendors in varying formats and produce standardized, formatted output data that can be utilized by a variety of software applications.

The system 100 can receive or retrieve input data from one or more input data stores 102. A single data store 102 is illustrated here for simplicity; however, input data from multiple input data stores provided by various vendors can be processed. A data store, as used herein, is any collection of data including, but not limited too, a database or collection of files, including text files, web pages, image files, audio data, video data, word processing files and the like. Data within the input data store 102 can be formatted in any manner. Typically, each vendor will have one or more distinct formats, which can be updated at the vendor's convenience. Generally, vendors provide a schema included with the input data that describes the content, type and format of input data from the input data store 102.

In addition, data formats can vary based upon region specific data. In particular, the data for geographic entities can vary based upon the region in which the entity is located. For example, the United States includes the fifty states, while Canada is made up of provinces and territories. Addresses in the United States are denoted by street, city, state, postal code and country, if necessary. Addresses in the United Kingdom are typically denoted by street address, primary city, secondary city, postal code and country.

Data transformation can include selecting a subset of the input data for inclusion in the output data 108. Typically, vendors supply data to a number of customers for a variety of purposes. Only a small portion of the data may be relevant to the applications or users of the output data store 108. For example, if an application retrieves or generates road maps or directions for use by the general public, certain information such as latitude, longitude and elevation may be unnecessary. Consequently, information relevant to end users and applications can be included in the output data while information that is irrelevant can be discarded or ignored.

The rule data store 106 includes one or more sets of rules for generating output data based upon the input data. A rule can define an executable expression for generating output data from the input data. For example, a rule can define a type conversion between a portion of the input data and the output data. Rules can be grouped in rule sets, where a rule set is a logical collection of rules. For example, separate rule sets can be defined for each country, vendor, version, theme or any other logical grouping of rules. In addition, a hierarchy of rule sets can be defined. For example, the rule set for London, England can include a reference to a rule set specific to city data and a rule set specific to the United Kingdom, such that when the rule set for London is retrieved, the rule sets for city data and the United Kingdom are also automatically retrieved.

The transformation component 104 utilizes one or more rules or rule sets from the rule data store 106 to parse and process input data from the input data store 102. The transformation component 104 can retrieve or obtains the appropriate set of rules just prior to processing of input data. Consequently, changes to the format of the input data can be accommodated by updating one or more rules in the rule data store 106, instead of modifying or updating the transformation component 104. The transformation component 104 can execute each rule on each record of the input data to generate the output data.

Figure 2:
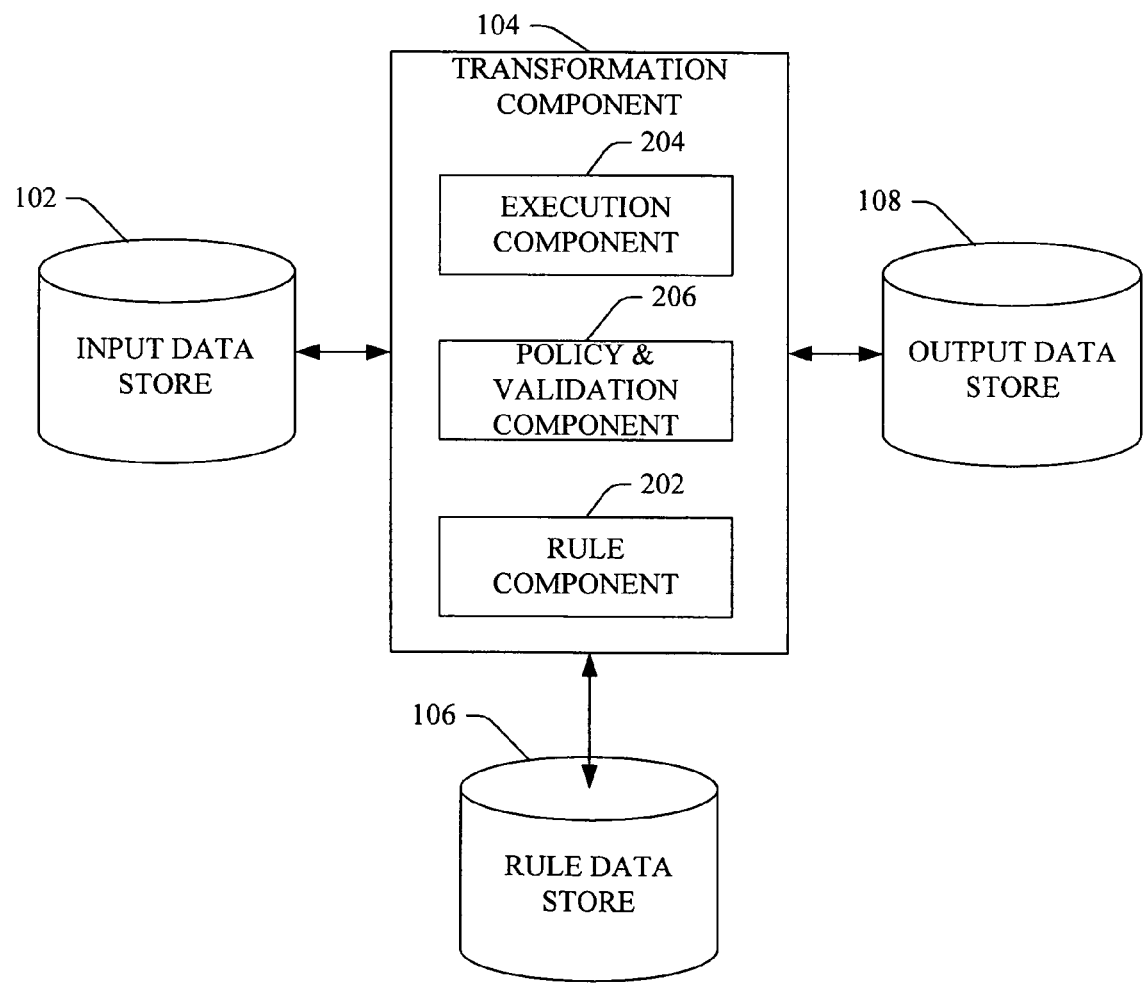
FIG. 2 is a block diagram of a system for transforming input data in accordance with an aspect of the subject matter disclosed herein.

Referring now to FIG. 2, the transformation component 104 includes a rule component 202, an execution component 204 and a policy and validation component 206. The rule component 202 can obtain one or more rules or rule sets from the rule data store 106. Once the appropriate rules have been retrieved from the rule data store 106, the rules can be converted and/or compiled to generate an executable rule set in preparation for processing input data. As used herein, an executable rule set can be executable code generated based upon a set of rules. Rules can be defined using any rule-based language, including natural languages such as English. If the rules are stored in a natural language, the rule component can include or utilize a natural language parser to parse the rule prior to conversion and/or compilation. The rule component 202 can parse the rules retrieved from the rule data store 106 to produce the executable rule set. In one aspect, the rules can be defined using a markup language such as extended markup language (XML). Accordingly, the rule data store 106 can be implemented using an XML file and a predefined rule schema can be established to describe or define rules. In one aspect, the rule component 202 can convert rules defined in XML to the C# programming language and compile the C# code at input data processing time for execution on the records of the input data.

Each rule can include instructions for processing input data as well as additional meta data. Meta data can include, but is not limited to, an identification number used to uniquely identify the rule, a name, a priority, and a description. The rule name and description can be utilized to assist developers in identifying rules. Rule priority can be used to establish an order in which rules will be executed over the input data.

Rules can be defined to map input data from the vendor specific format in which it is provided to the standardized format of the output data. For example, the vendor data can include an abundance of data, much of which is irrelevant to groups of users. The rules can be defined so as to identify and select the relevant data from the input data for inclusion in the output data. For example, input data from a vendor can include detailed information regarding voting districts, latitude, longitude or elevation. This information is unlikely to be useful to a user seeking directions from one location to a specific address. Consequently, an application for generating a route or directions is unlikely to utilize such information. Rules used to generate output data for such applications can select relevant data such as street addresses, cities and the like, while filtering out data that is irrelevant for such purposes.

In addition, rules can be used to analyze the input data and generate additional data for inclusion in the output data. For example, one or more rules can classify types of geographic entities based upon data provided in the input data. For example, the vendor input data can identify a street or road as being accessible by automobile and having a speed limit of sixty-five miles per hour. The rule data store 106 can include a rule that classifies roads that are automobile accessible with speed limits greater than forty-five miles per hour as "highways"; while automobile accessible roads having speed limits less than forty-five miles per hour are classified as "local roads." In this manner, one or more rules can be utilized to generate data classifications. These data classifications can be used by an application accessing the output data store 108. For example, a user may wish to generate a route to the art museum, but is afraid of highway driving. The application can utilize the road classification data generated by the rules to prepare an appropriate route without using roads classified as highways.

Typically, rules are selected for use in data transformation based upon the rule set to which the rule belongs. Rule sets can be static or unchanging, in which case the rule set can be converted and/or compiled prior to use by the transformation component 104. This pre-conversion or pre-compilation can reduce the amount of time required for data processing. Typically, rule sets are dynamic in nature. Dynamic rules sets can be modified, including adding, deleting and updating rules included in the rule set. Dynamic rule sets are converted and/or compiled when they are selected and retrieved by the transformation component 104. Accordingly, rules within a dynamic rule set can be added, deleted or modified just prior to retrieval by the transformation component 104 for input data processing. In addition, a rule set can include certain meta data such as an identification number to uniquely identify the rule set, a name, a description of the rule set and a priority for the rule set. The rule set priority can be used by the execution component 204 to determine the order of execution of the rules sets.

The execution component 204 can run one or more executable rule sets against each record obtained from the input data store 102. The rule set or sets can be retrieved, converted and/or compiled once for the first data record. The resulting executable rule set can then be utilized to process the remainder of the data records. The execution component 204 can store the output data in the output data store 108 where it can be utilized by one or more applications and/or users.

The policy and validation component 206 can validate rule execution permissions as well as other rule policies. For example, access to or rights to generate output data or update the output data store 108 can be limited to specific users or classes of users. In addition, users can have limited access rights to certain specific rules sets. For example, one team or class of users can be responsible for aggregating and transforming geographic data for Europe, while an entirely different team can be responsible for aggregating and transforming geographic data for China. The team responsible for Europe can be denied rights to access the output data stores and rules set for Chinese data. A set of rule policies can define which users or classes of users should have access to update output data stores and/or utilize the rule sets. The policy and validation component can verify the user permissions when the rule sets are selected for processing.

Figure 3:
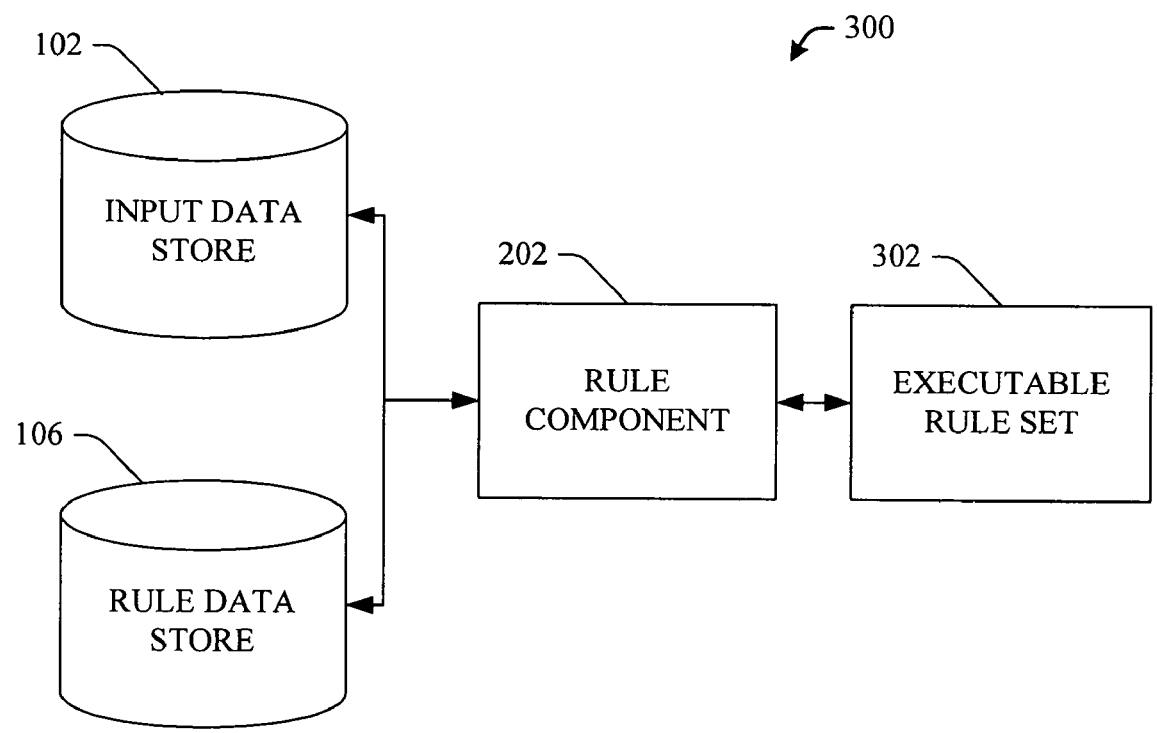
FIG. 3 is a block diagram of a system for compiling rules in accordance with an aspect of the subject matter disclosed herein.

Referring now to FIG. 3, a system 300 for generating an executable rule set is illustrated. The rule component 202 can retrieve one or more rule sets from the rule data store 106. The rule sets retrieved can be based upon the vendor, the geographic region, the desired format of the output data and the like. The rule component 202 can obtain a vendor data schema from the input data store 102. The vendor data schema can define the format of the vendor data records. For example, the vendor data schema can specify that characters forty-eight through fifty-six denote the postal code of an address. The rule component 202 can utilize the data from the vendor data schema to determine how to parse the input data. For example, the rule component 202 can generate software code that parses the input data records and temporarily stores the data into type specific fields. The rule component 202 can also utilize one or more rule sets obtained from the rule data store 106 to generate an executable rule set 302. The executable rule set 302 can be executed over the typed data produced by parsing the input data records to generate the output data.

Figure 4:
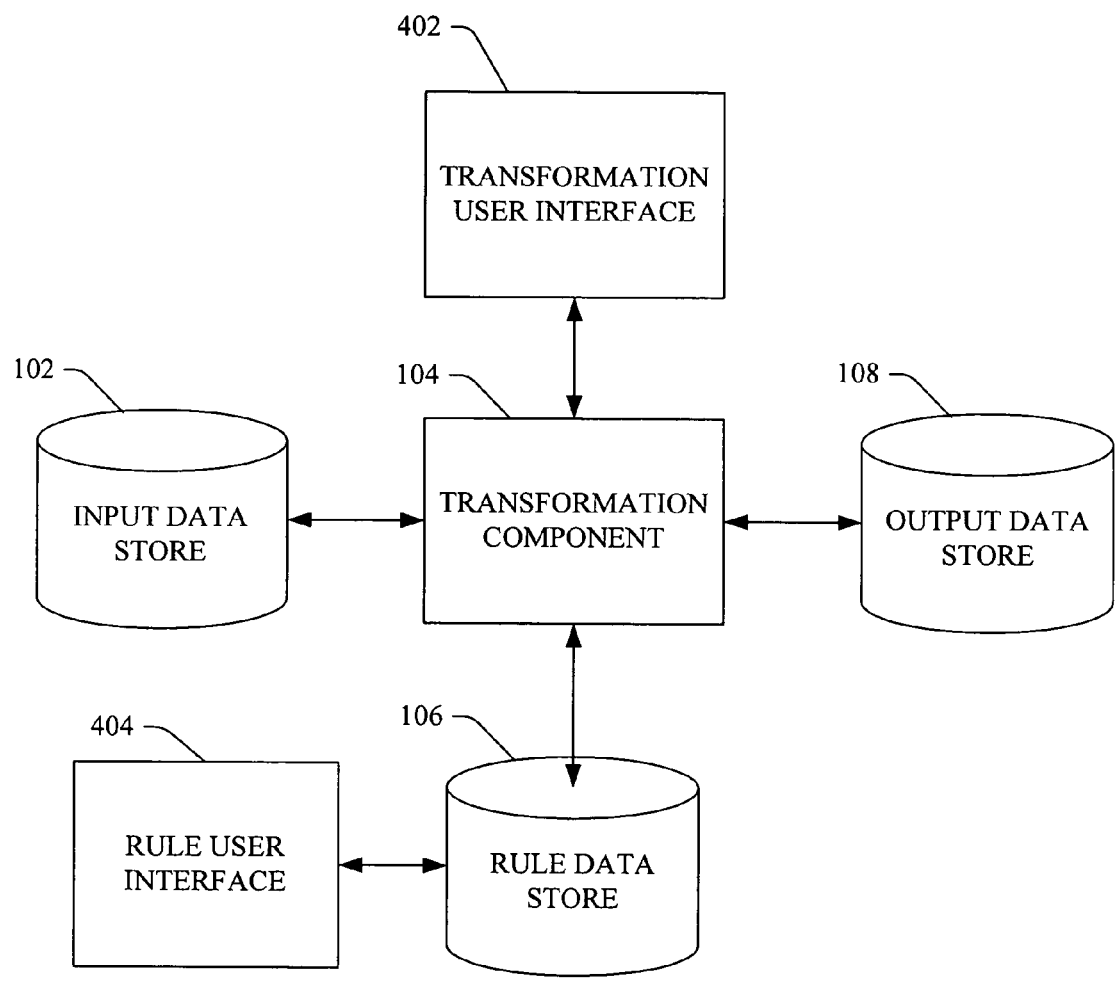
FIG. 4 is a block diagram of a system for transforming input data including a user interface in accordance with an aspect of the subject matter disclosed herein.

Referring now to FIG. 4, a system for transforming data including a user interface is illustrated. The system can include a transformation user interface 402. The transformation user interface 402 can be a graphical user interface (GUI) that provides one or more users with the ability to initialize, generate and/or monitor the transformation of data, particularly geographic data. The transformation user interface 402 can require users to log in to the system to perform user authentication before the user can utilize the system, helping to ensure data integrity. The transformation user interface 402 can provide users with the ability to select input data from one or more input data stores 102. In addition, the transformation user interface 402 can allow users to select one or more rule sets from the rule data store 106 to apply to the input data. The transformation user interface 402 can also provide users with the ability to update an existing output data store 108 or to generate a new output data store 108. User selections can be limited based upon a user's access rights and permissions.

The transformation user interface 402 can allow users to monitor the data transformation process. The transformation user interface 402 can alert users to errors or possible problems during the transformation process. For example, if the system encounters an error while loading a rule set, the transformation user interface 402 can generate an alert and continue loading any additional rule sets, wait a predetermined time interval for a user to respond, cancel the transformation process or perform any other reasonable actions in response to the error. In addition, the transformation user interface 402 can generate an alert if the input data does not match the vendor data schema or if any other problems or possible errors are detected.

A rule user interface 404 can be provided to allow users to update the rule data store 106. Users can utilize the rule user interface 404 to generate, modify or delete rules or rule sets. The rule user interface 404 can require users to log in and perform user authentication prior to accessing the rule data store 106. The rule user interface 404 can prompt the user for information necessary to generate a rule, verify that proper rule syntax is used and allow the user to view rules and rule sets. In addition, the rule user interface 404 can allow users to generate, modify or delete rule sets. Selected users can utilize the rule user interface 404 to view and modify rule and rule set meta data, such as priorities and rule policies.

Figure 5:
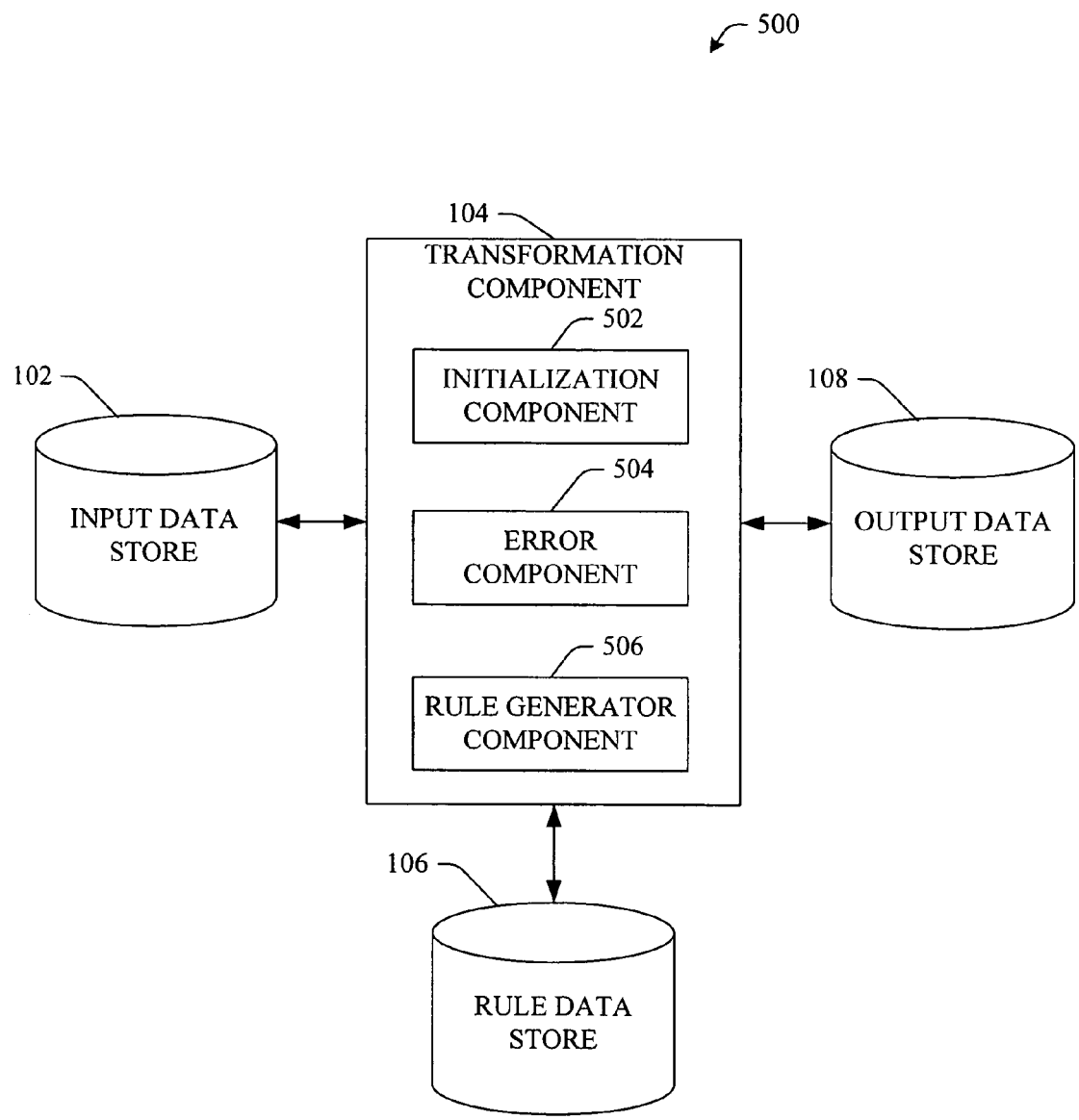
FIG. 5 is a block diagram of a system for transforming input data in accordance with an aspect of the subject matter disclosed herein.

Referring now to FIG. 5, a system 500 for transforming input data utilizing artificial intelligence components is illustrated. The system 500 can include an initialization component 502. The initialization component 502 can retrieve or load the appropriate rules and prepare the transformation component 104 for processing while requiring minimum manual intervention by the user. In one aspect, the initialization component 502 can periodically prepare the transformation component 104 for processing. The initialization component 502 can parse the initial record of the input data, determine the relevant rule set or sets and load the appropriate rule set or sets from the rule data store 106. For example, the initialization component 502 can parse the first record of the input data using the vendor data schema and determine a country code, UK, for the United Kingdom. Based upon past input data and transformations, the initialization component 502 can infer that the relevant rule sets include the rule set for the United Kingdom. The initialization component 502 can include a machine learning system, such as a neural network, a support vector machine ("SVM"), a perceptron and the like.

An artificial intelligence component can be implemented using a machine learning system such as a neural network, a support vector machine ("SVM"), a perceptron and the like. In general, machine learning systems go through a training phase to improve performance and generate optimal results. During a typical training phase, training data is input into a machine learning system and internal system parameters are adjusted based upon the output of the machine learning system and the desired results. Here, training data can include input data from previous time periods as well as certain predetermined facts, such as the number of digits in the United States postal codes. Both explicit and implicit user feedback can be used to tune the learning machine and improve performance. The training phase continues until the machine learning system reaches an acceptable level of performance. Generally, increasing the size of the training data set improves system performance, but also increases the time required to train the machine learning system. Once the machine learning system achieves a level of performance, the parameters of the machine can be frozen. Alternatively, the machine learning system can be continually adjusted; effectively providing for continuous training.

The system 500 can also include an error component 504. The error component 504 can identify likely errors in the input data. The error component 504 can utilize rules from the rule data store 106 to detect inconsistent data and flag the inconsistency as a possible error or mistake. For example, the rule set for the United Kingdom can include a rule that indicates that postal codes include alphanumeric characters. Consequently, a postal code containing a punctuation mark would be detected as an error in the input data.

The error component 504 can be implemented using previous input data to identify probable errors in the current input data. The input data can be compared to historical input data. Data from previous quarters can be maintained and used for comparison. For example, the input data store 102 can include data from previous time periods, such as the preceding month or quarter. Alternatively, separate input data stores 102 containing input data from preceding quarters or time periods can be included. In another aspect, previous data values can be maintained in the output data store 108 and used to determine changes in data values.

In addition, the error component 504 can include an artificial intelligence component trained using data from the preceding quarters to detect unusual changes in data. For example, if the input data indicates that interstate 90 has a speed limit of forty miles per hour and the interstate has been marked with a speed limit of sixty miles per hour for the last three sets of input data, the error component 504 can detect an unusual change.

The error component 504 can generate a confidence level for specific items of input data to indicate the likelihood that the data includes an error. Certain items or data types are more likely to change than others. For example, street addresses are likely to change due to road, building and other construction. However, other geographic data, such as city names, speed limits and the like, are less likely to change. Accordingly, the error component 504 can generate a confidence level depending upon the likelihood or probability that a data inconsistency is due to an error in the input data rather than reflecting an actual change in geographic conditions. The confidence level can vary based upon geographic region as well as geographic data type. For example, the likelihood of an addition of a new street can be high in a region experiencing a construction boom, such as Florida. Accordingly, the confidence level for a change to street address for that region would be high. On the other hand, for regions experiencing slow or little growth, the likelihood of change would be correspondingly lower and therefore the confidence level for a street name change would also be lower.

The error component 504 can also manage detected errors. Error thresholds can be established to determine the appropriate response to probable errors. For entity types that are likely to change, a detected error can generate only a simple notation in a log. However, for an entity that is unlikely to change, the error component 504 can automatically correct the data and generate an alert for a user. Alerts can include opening a window on the GUI, recording the error in a log or sending an email indicating the error. A series or hierarchy of thresholds can be defined by a user or can be learned by the error component 504 based upon implicit or explicit user feedback.

The system 500 can also include a rule generator component 506. The rule generator component 506 can utilize an artificial intelligence component to generate rules based upon historical input data and user feedback. Rules created by the rule generator component 506 can be included in the rule data store 106 for use in further transformations.

The aforementioned systems have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Additionally, it should be noted that one or more components may be combined into a single component providing aggregate functionality or divided into several sub-components. The components may also interact with one or more other components not specifically described herein but known by those of skill in the art.

Furthermore, as will be appreciated various portions of the disclosed systems above and methods below may include or consist of artificial intelligence or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent.

In view of the exemplary systems described supra, methodologies that may be implemented in accordance with the disclosed subject matter will be better appreciated with reference to the flowcharts of FIGS. 6-9. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

Additionally, it should be further appreciated that the methodologies disclosed hereinafter and throughout this specification are capable of being stored on an article of manufacture to facilitate transporting and transferring such methodologies to computers. The term article of manufacture, as used, is intended to encompass a computer program accessible from any computer-readable device, carrier, or media.

Figure 6:
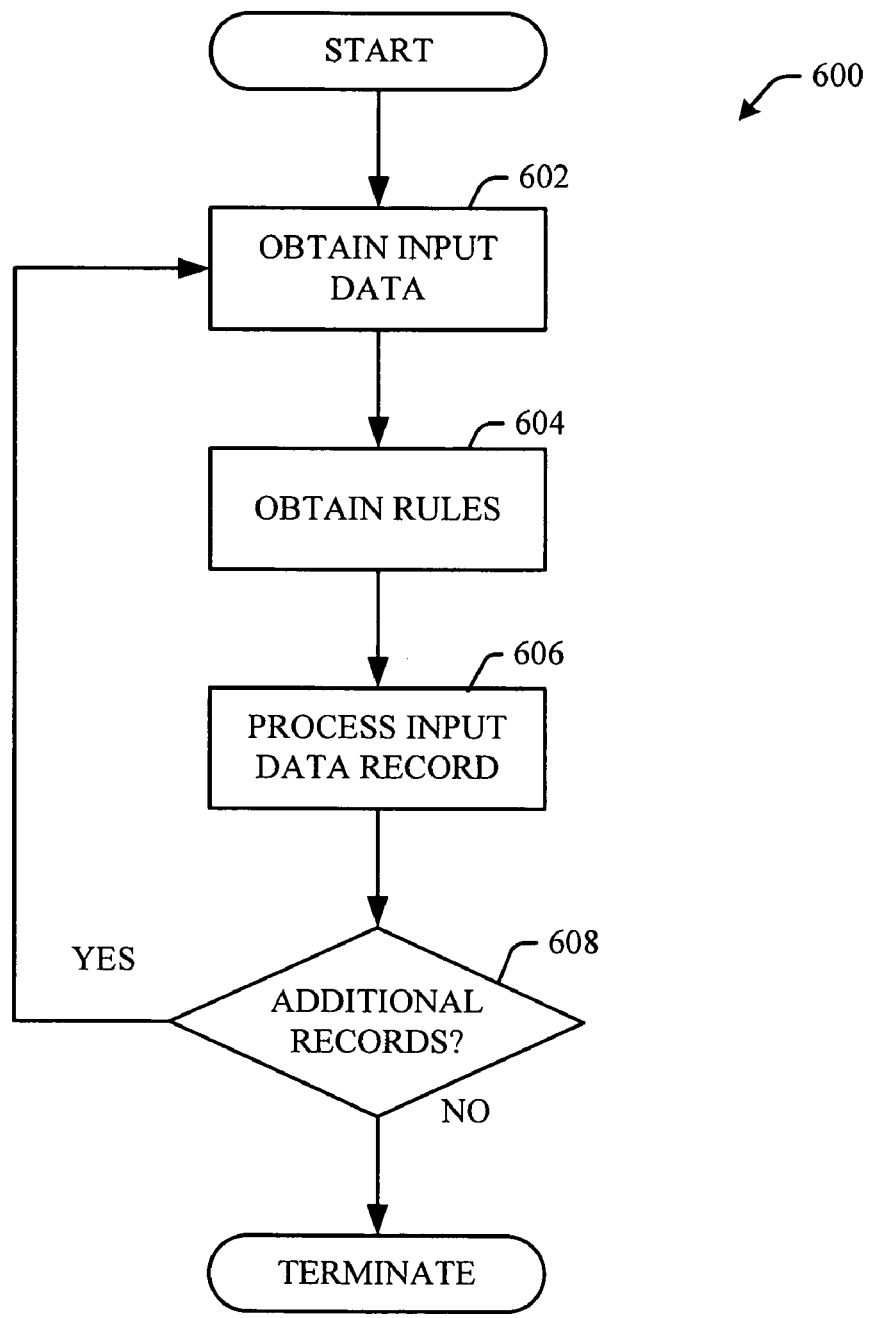
FIG. 6 illustrates a methodology for transforming input data in accordance with an aspect of the subject matter disclosed herein.

Referring now to FIG. 6, a methodology 600 for transforming input data is illustrated. At 602, input data is obtained. Input data can include a schema that defines the format of the data records included in the input data. For example, the data records can include any form of geographic data including divisions such as street addresses, cities, states, provinces, countries as well as geographic features such as lakes, mountains, oceans and the like. Input data can be retrieved or selected manually by a user or automatically. At 604, one or more rule sets relevant to the input data are retrieved. The rule set or sets can be selected and retrieved based upon user direction or the appropriate rule set or sets can be selected and retrieved automatically based upon the data contained within the input data and prior data transformations. The first record of the input data is processed according to the rules of the retrieved rule sets at 606. At 608, a determination is made as to whether there are additional input data records to process. If yes, the next record is processed at 606. If no, the process terminates.

Figure 7:
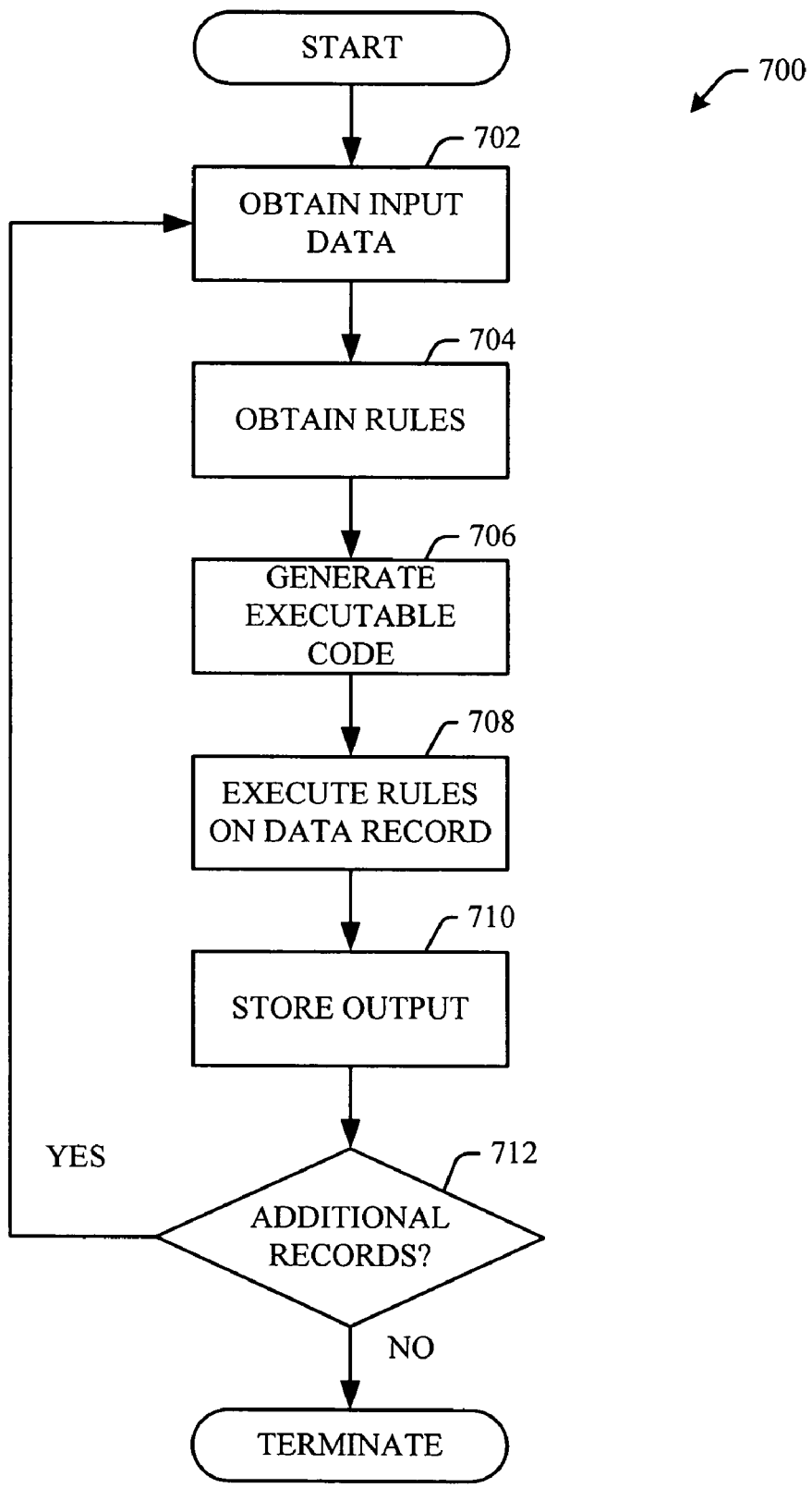
FIG. 7 illustrates a methodology for transforming input data in accordance with an aspect of the subject matter disclosed herein.

Referring now to FIG. 7, a methodology 700 for transforming geographic data utilizing a compiled set of rules is illustrated. At 702, a set of input records is received. One or more sets of rules for processing the input records are obtained at 704. The rules can be selected and retrieved based upon user direction. Alternatively, the relevant rules can be automatically selected and retrieved based upon the data contained in the input data and prior data transformations. Executable code can be generated from the rule set or sets at 706. At 708, the executable code generated from the rules is executed on the first data record. The executable code can be executed in order based upon a priority assigned to each rule used to generate the code. The output data generated by executing the code can be stored in a data store at 710. At 712, a determination is made as to whether there are additional input data records to process. If yes, the executable code based upon the rules is executed on the next data at 708. If no, the process terminates.

Figure 8:
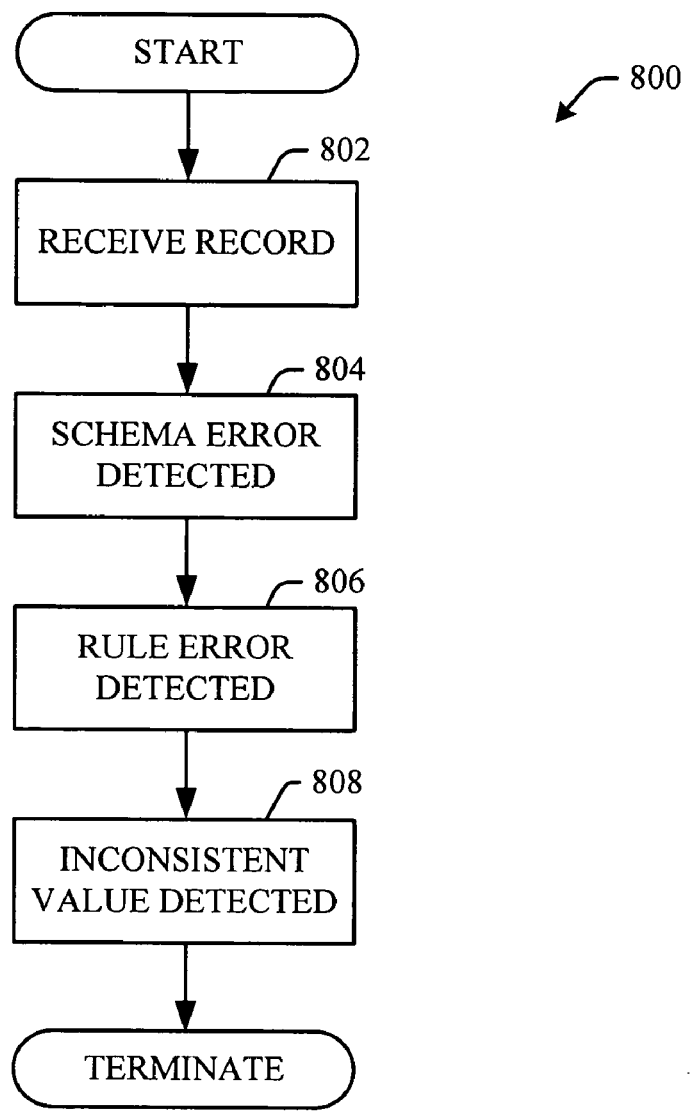
FIG. 8 illustrates a methodology for detecting errors during transformation of input data is illustrated.

Referring now to FIG. 8, a methodology 800 for detecting error in input data for data transformations is illustrated. At 802, a data record of the input data is received. If the data record is inconsistent with the vendor data schema included with the input data, an error is detected at 804. At 806, executable code generated from a set of rules is executed on the data record and inconsistencies between the data record and the rules are detected and classified as errors. For example, the rules can indicate that postal codes are alphanumeric. Consequently, a postal code with a non-alphanumeric symbol, such as an ampersand, would be detected as an error. At 808, possible errors are detected based upon inconsistencies with historical input data. The current record can be checked directly against records from historical input data. An error can be inferred when the data values current data record are inconsistent with the values of the historical input data. Alternatively, an artificial intelligence component can be trained to detect errors using historical input data.

Figure 9:
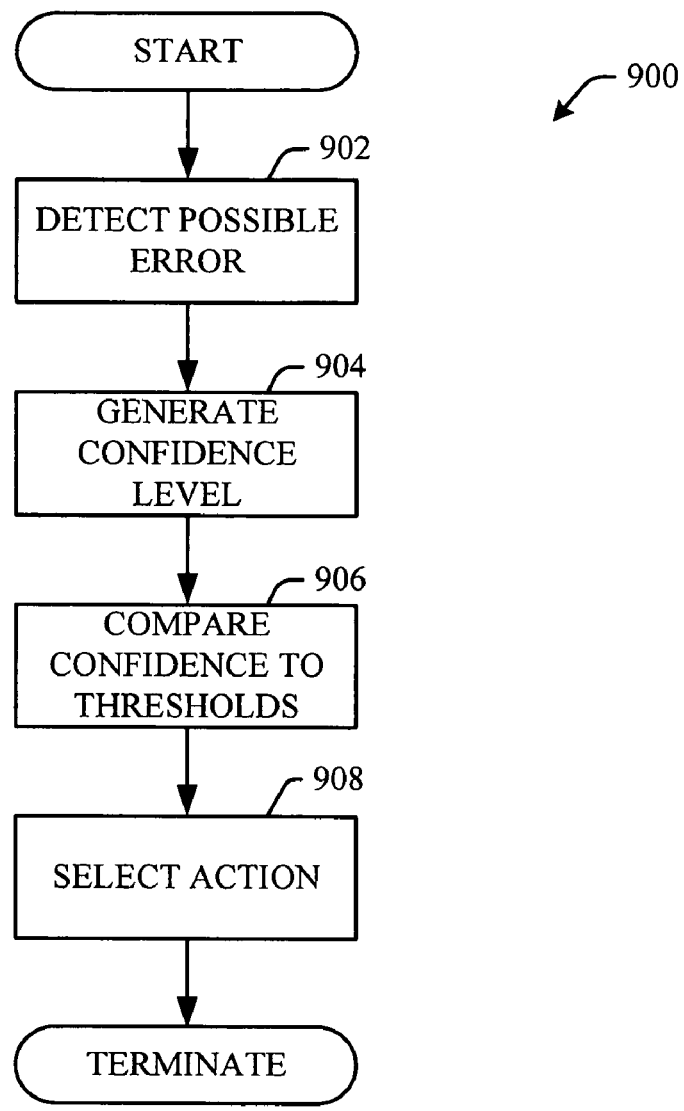
FIG. 9 illustrates a methodology for handling errors during transformation of input data is illustrated.

Referring now to FIG. 9, a methodology 900 for handling errors detected during data transformation is illustrated. At 902, a possible error in the input data is detected. Possible errors can be detected based upon inconsistencies between the current input data and historical input data. A confidence level reflecting the likelihood that the detected error is in fact due to erroneous input data rather than an actual change in the underlying data (e.g., a change to a geographical feature) is generated at 904. At 906, the confidence level can be compared to one or more thresholds. A set of one or more thresholds can be used to determine the course of action to be taken based upon the detection of a possible error. In addition, different sets of thresholds can be used based upon the type of entity for which an error is detected. At 908, the error is handled and an appropriate course of action is selected based upon the comparison of the confidence level to the threshold. For example, if the confidence is level is higher than the given threshold, the error can be automatically corrected. However, if the confidence level is lower than the threshold, the error is not corrected and instead an email can be sent to a user, alerting the user of the possible error. A variety of actions can be selected based upon the confidence level, including, but not limited to, entering a notation in a log, sending an email, automatically correcting the error and prompting a user for the appropriate course of action.

Figure 10:
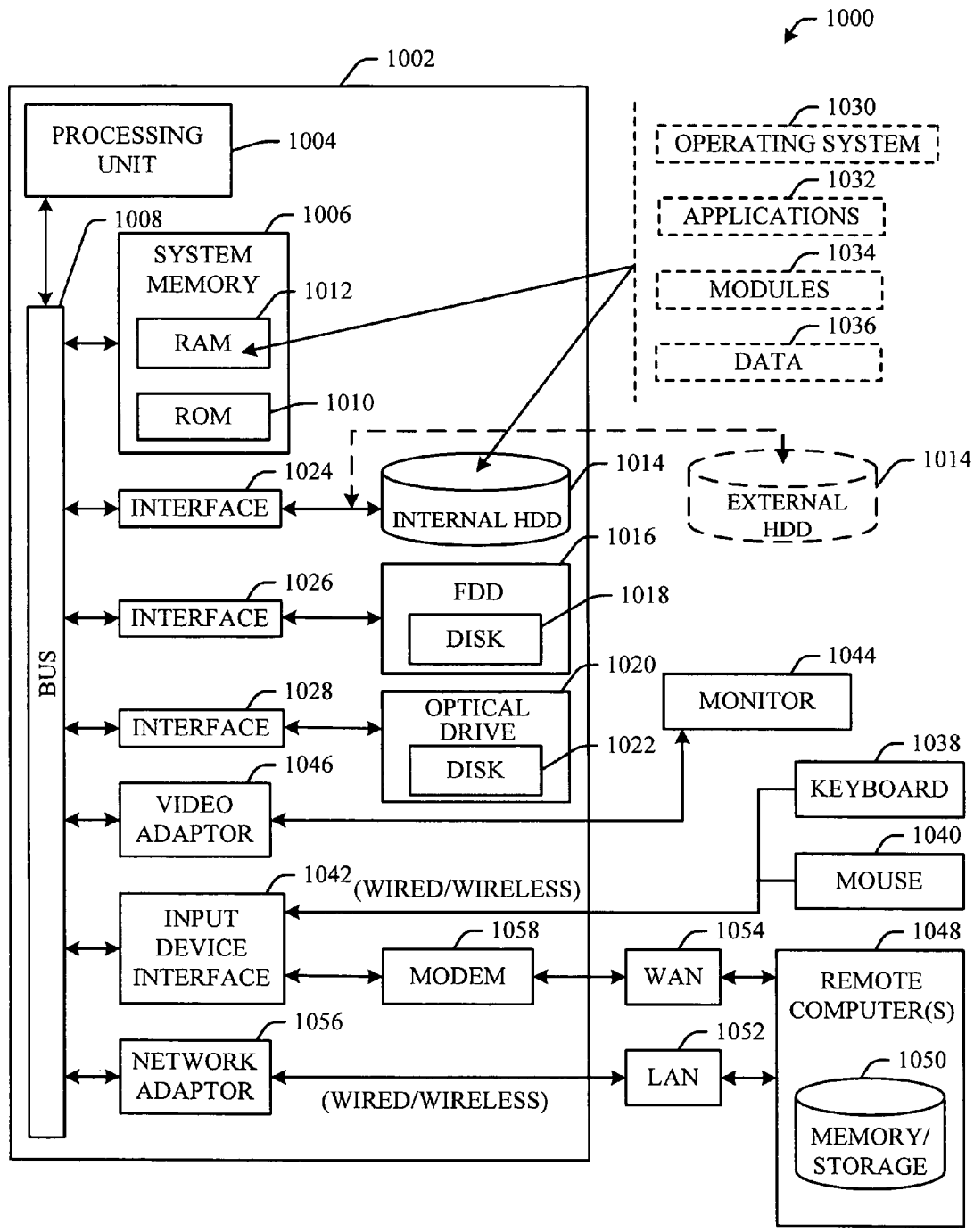
FIG. 10 is a schematic block diagram illustrating a suitable operating environment.
Figure 11:
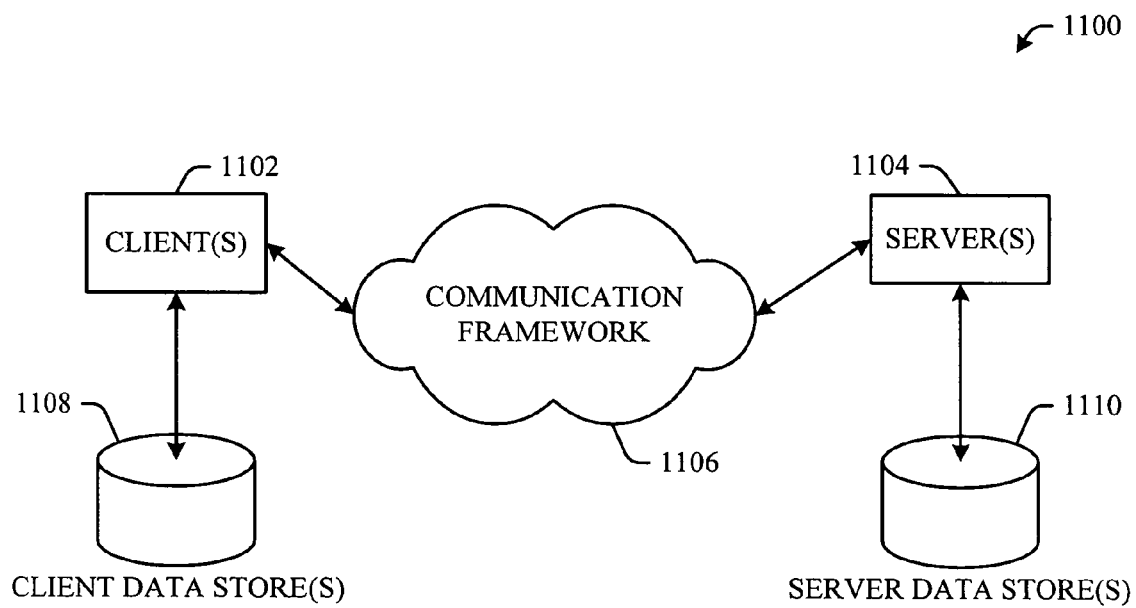
FIG. 11 is a schematic block diagram of a sample-computing environment.

In order to provide a context for the various aspects of the disclosed subject matter, FIGS. 10 and 11 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that the systems and methods described herein also may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all of the aspects can be practiced on stand-alone computers. In a distributed computing environment, program modules may be located in both local and remote memory storage devices.

With reference again to FIG. 10, the exemplary environment 1000 for implementing various aspects of the embodiments includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures may also be employed as the processing unit 1004.

The system bus 1008 can be any of several types of bus structure that may further interconnect to a memory bus (with or without a memory controller), a peripheral bus, and a local bus using any of a variety of commercially available bus architectures. The system memory 1006 includes read-only memory (ROM) 1010 and random access memory (RAM) 1012. A basic input/output system (BIOS) is stored in a non-volatile memory 1010 such as ROM, EPROM, EEPROM, which BIOS contains the basic routines that help to transfer information between elements within the computer 1002, such as during start-up. The RAM 1012 can also include a high-speed RAM such as static RAM for caching data.

The computer 1002 further includes an internal hard disk drive (HDD) 1014 (e.g., EIDE, SATA), which internal hard disk drive 1014 may also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE 1394 interface technologies. Other external drive connection technologies are within contemplation of the subject systems and methods.

The drives and their associated computer-readable media provide nonvolatile storage of data, data structures, computer-executable instructions, and so forth. For the computer 1002, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods for the embodiments of the data management system described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is appreciated that the systems and methods can be implemented with various commercially available operating systems or combinations of operating systems.

A user can enter commands and information into the computer 1002 through one or more wired/wireless input devices, e.g., a keyboard 1038 and a pointing device, such as a mouse 1040. Other input devices (not shown) may include a microphone, an IR remote control, a joystick, a game pad, a stylus pen, touch screen, or the like. These and other input devices are often connected to the processing unit 1004 through an input device interface 1042 that is coupled to the system bus 1008, but can be connected by other interfaces, such as a parallel port, an IEEE 1394 serial port, a game port, a USB port, an IR interface, etc.

A monitor 1044 or other type of display device is also connected to the system bus 1008 via an interface, such as a video adapter 1046. In addition to the monitor 1044, a computer typically includes other peripheral output devices (not shown), such as speakers, printers, etc.

The computer 1002 may operate in a networked environment using logical connections via wired and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which may connect to a global communications network, e.g., the Internet.

When used in a LAN networking environment, the computer 1002 is connected to the local network 1052 through a wired and/or wireless communication network interface or adapter 1056. The adaptor 1056 may facilitate wired or wireless communication to the LAN 1052, which may also include a wireless access point disposed thereon for communicating with the wireless adaptor 1056.

When used in a WAN networking environment, the computer 1002 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 via the serial port interface 1042. In a networked environment, program modules depicted relative to the computer 1002, or portions thereof, can be stored in the remote memory/storage device 1050. It will be appreciated that the network connections shown are exemplary and other means of establishing a communications link between the computers can be used.

The computer 1002 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

FIG. 11 is a schematic block diagram of a sample-computing environment 1100 with which the systems and methods described herein can interact. The system 1100 includes one or more client(s) 1102. The client(s) 1102 can be hardware and/or software (e.g., threads, processes, computing devices). The system 1100 also includes one or more server(s) 1104. Thus, system 1100 can correspond to a two-tier client server model or a multi-tier model (e.g., client, middle tier server, data server), amongst other models. The server(s) 1104 can also be hardware and/or software (e.g., threads, processes, computing devices). One possible communication between a client 1102 and a server 1104 may be in the form of a data packet adapted to be transmitted between two or more computer processes. The system 1100 includes a communication framework 1106 that can be employed to facilitate communications between the client(s) 1102 and the server(s) 1104. The client(s) 1102 are operably connected to one or more client data store(s) 1108 that can be employed to store information local to the client(s) 1102. Similarly, the server(s) 1104 are operably connected to one or more server data store(s) 1110 that can be employed to store information local to the servers 1104.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has" or "having" are used in either the detailed description or the claims, such terms are intended to be inclusive in a manner similar to the term "comprising" as "comprising" is interpreted when employed as a transitional word in a claim.

What is claimed is:

1. A system for transforming geographical data from various vendor formats to a standardized format, comprising:
    a first memory for storing first data from a first data source, the first data having a first format, and for storing second data from a second data source, the second data source having a second format;
    a second memory for storing a first rule for transforming said first data from the first data source into said common output data and for storing a second rule for transforming said second data from the second data source into said common output data; and
    a processor coupled to the second memory for selecting data to be transformed into said output data, for identifying a source of the data to be transformed, and for transforming the data according to said first rule if the identified source of data comprises the first data source and for transforming the data into said output data according to said second rule if the identified source of data comprises the second data source.

2. The system of claim 1, the processor is further for generating executable code from the rule associated with the selected data from the second memory; and for
    executing the executable code over the selected data.

3. The system of claim 1, the processor further for utilizing a machine learning system to identify possible errors in the data stored in the first memory based at least in part upon previously stored data.

4. The system of claim 1, the processor further for generating a new rule using an inference based at least in part on previously stored data.

5. The system of claim 1, further comprising:
    a transformation user interface that allows a user to select one of said rules the second memory.

6. The system of claim 1, further comprising:
    a rule user interface that provides a user with the ability to update the second memory.

7. The system of claim 1, wherein each of said rules stored in said second memory is specified using a natural language.

8. A method for transforming geographical data from various vendor formats to a standardized format, comprising:
    storing a first set of data records arranged in a first format, the second set of data records comprising geographical data;

storing a second set of data records arranged in a second format, the second set of data records comprising geographical data;

storing a first set of instructions associated with the first format;

storing a second set of instructions associated with the second format; and converting said first set of data records into output data, said output data having said standardized format, using at least one instruction from the first set of instructions the at least one instruction defining an expression to execute on the first set of data records.

9. The method of claim 8, wherein the step of converting further comprises:

executing at least one instruction from the second set of instructions, the at least one instruction defining an expression to execute on the second set of data records.

10. The method of claim 9, wherein the at least one instruction from the second set of instructions has an associated priority and the at least one instruction from the second set of instructions is executed in order based at least in part upon the priority.

11. The method of claim 8, further comprising:

detecting a possible error in the input data based at least in part on at least one of said instructions.

12. The method of claim 8, further comprising:

detecting a possible error in the first set of data records using an inference based at least in part on previously stored data.

13. The method of claim 12, further comprising:

generating a confidence level for the possible error; and selecting an error handling action based upon a comparison of the confidence level to a predefined threshold.

14. The method of claim 8, further comprising:

generating an additional instruction using an inference based at least in part on previously stored data; and maintaining the additional instruction with the first set of instructions.

15. The method of claim 8, wherein the at least one instruction from the first set of instructions is selected using an inference based at least in part on previously stored data.

16. A system for processing geographical data from multiple vendors in a variety of formats to generate standardized output comprising:

means for storing a first set of data records arranged in a first format and for storing a second set of data records arranged in a second format, the first and second set of data records comprising geographical data;

means for storing a first set of instructions associated with the first format and for storing a second set of instructions associated with the second format; and means for converting said first set of data records into output data, said output data having said standardized format, using at least one instruction from the first set of instructions, the at least one instruction defining an expression to execute on the first set of data records.

17. The system of claim 16, further comprising:

means for generating an additional instruction utilizing a machine learning system; and storing the additional instruction in the means for storing a first set of instructions.

18. The system of claim 16, further comprising:

means for detecting a possible error in the first set of data records;

means for assigning a probability to the possible error; and means for performing error handling based at least in part on the probability of the possible error.

19. The system of claim 16, further comprising:

means for selecting the at least one instruction from the instruction data store.

* * * * *